(12) United States Patent
Matsushita et al.

(10) Patent No.: US 6,688,440 B2
(45) Date of Patent: Feb. 10, 2004

(54) BICYCLE BRAKE DEVICE WITH A ROTATION RESTRICTOR FOR A CONNECTING JOINT

(75) Inventors: Tatsuya Matsushita, Sakai (JP); Keiji Matsueda, Shimonoseki (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/378,417

(22) Filed: Feb. 28, 2003

(65) Prior Publication Data

US 2003/0173160 A1 Sep. 18, 2003

(30) Foreign Application Priority Data

Mar. 7, 2002 (JP) .......................... 2002-062402

(51) Int. Cl.[7] .............................. B62L 5/14; B60T 11/00
(52) U.S. Cl. ................. 188/344; 188/24.11; 188/24.22
(58) Field of Search .................. 188/344, 358, 188/359, 360, 24.22, 24.11; 74/502.4

(56) References Cited

U.S. PATENT DOCUMENTS

| 5,050,381 | A |   | 9/1991  | Matsuno et al. |         |
|-----------|---|---|---------|----------------|---------|
| 5,228,725 | A |   | 7/1993  | Aoyagi et al.  |         |
| 5,678,665 | A | * | 10/1997 | Debreczeni     | 188/344 |
| 6,170,617 | B1|   | 1/2001  | Nakamura       |         |
| 6,527,303 | B2| * | 3/2003  | Kariyama et al.| 285/249 |

FOREIGN PATENT DOCUMENTS

FR        2674491 A1   10/1992

\* cited by examiner

*Primary Examiner*—Christopher P. Schwartz
(74) *Attorney, Agent, or Firm*—James A. Deland

(57) ABSTRACT

A brake control device is provided for connecting to a hydraulic fluid conduit, wherein the hydraulic fluid conduit has a first end for connecting to the brake control device and a second end for connecting to a braking apparatus. The brake control device comprises a bracket that can be mounted to a handlebar of the bicycle, a brake operating member that is movably coupled to the bracket, and a hydraulic fluid transmission unit disposed on the bracket. The hydraulic fluid transmission unit is structured to communicate a hydraulic fluid to the hydraulic fluid conduit in response to movement of the brake operating member. A joint securing area is disposed on the hydraulic fluid transmission unit, wherein the joint securing area is structured to couple to the first end of the hydraulic fluid conduit. A rotation restrictor is disposed at the joint securing area, wherein the rotation restrictor is structured to restrict rotation of the first end of the hydraulic fluid conduit relative to the joint securing area.

24 Claims, 7 Drawing Sheets

BICYCLE BRAKE DEVICE WITH A ROTATION RESTRICTOR FOR A CONNECTING JOINT

BACKGROUND OF THE INVENTION

The present invention is directed to bicycles and, more particularly, to various features of a bicycle brake device.

Bicycle brake control devices typically are mounted to the handlebar of the bicycle. Such devices often comprise a brake bracket that is mounted to the handlebar and a lever member that is movably mounted to the brake bracket. When the brake apparatus is operated using hydraulic power, the lever member is operatively connected to the brake apparatus via a hydraulic fluid transmission unit that generates hydraulic pressure in accordance with the movement of the lever member and transmits this pressure to the brake apparatus.

The hydraulic fluid transmission unit typically is integrally formed with the bracket. The hydraulic fluid transmission unit has a tank that stores the hydraulic fluid, a master cylinder, and a piston. The piston is constructed such that one end can come into contact with the lever member. When the lever member is moved toward the handlebar, pressure is exerted on another end of the piston to compress the hydraulic fluid from the tank into the master cylinder.

A joint securing area for securing a rotatable connecting joint, termed a 'banjo', is disposed on the hydraulic fluid transmission unit. The connecting joint serves to fluidly connect the master cylinder to a brake hose, which acts as a hydraulic pipe. The connecting joint typically comprises a cylindrical member, a bolt member that extends through the center of the cylindrical member and screws into the joint securing area, and a hose connector that extends radially outwardly from the outer circumferential surface of the cylindrical member. The outer circumferential surface of the hose connector is adapted to be inserted into the brake hose. A caulking member is fixed to the hose connector with a gap between it and the outer circumferential surface of the cylindrical member in order to caulk and secure the brake hose to the hose connector.

A fluid pathway is formed in the bolt member such that fluid from the master cylinder travels through the tip of the bolt member and through the center of the bolt member. The fluid pathway opens out to the outer circumferential area of the bolt member at an intermediate location of the bolt member. The inner diameter of the cylindrical member is larger than the outer diameter of the bolt member, so a hydraulic fluid path is formed between the outer peripheral surface of the bolt member and the inner peripheral surface of the cylindrical member. This fluid path communicates the brake fluid to the hose connector and then to the braking apparatus. O-rings are disposed between one side surface of the cylindrical member and the hydraulic fluid transmission unit and between the other side surface of the cylindrical member and the top of the bolt member. When the connecting joint and the brake hose are assembled in this manner, the brake hose generally is oriented at an angle to the hydraulic fluid transmission unit in a manner that it does not become an obstacle even if the handlebar is turned.

When a connecting joint of the type having a bolt member as described above is mounted to a conventional hydraulic fluid transmission unit, the bolt member is rotated in a clockwise direction, for example, to tighten the bolt and thereby secure the connecting joint to the hydraulic fluid transmission unit. However, as the bolt member becomes tighter with the cylindrical member, the cylindrical member may rotate clockwise together with the bolt member, and the brake hose orientation may deviate from the desired direction. Similarly, when the bolt member is rotated in a counterclockwise direction to remove the connecting joint from the hydraulic fluid transmission unit, the cylindrical member may rotate counterclockwise together with the bolt member until the frictional force between the cylindrical member and the bolt member is sufficiently relieved. This results in the brake hose being pulled. Consequently, attaching and removing the connecting joint from the hydraulic fluid transmission unit becomes difficult and risks damage and/or misalignment of the brake hose.

SUMMARY OF THE INVENTION

The present invention is directed to inventive features of a bicycle brake device. In one embodiment, a brake control device is provided for connecting to a hydraulic fluid conduit, wherein the hydraulic fluid conduit has a first end for connecting to the brake control device and a second end for connecting to a braking apparatus. The brake control device comprises a bracket that can be mounted to a handlebar of the bicycle, a brake operating member that is movably coupled to the bracket, and a hydraulic fluid transmission unit disposed on the bracket. The hydraulic fluid transmission unit is structured to communicate a hydraulic fluid to the hydraulic fluid conduit in response to movement of the brake operating member. A joint securing area is disposed on the hydraulic fluid transmission unit, wherein the joint securing area is structured to couple to the first end of the hydraulic fluid conduit. A rotation restrictor is disposed at the joint securing area, wherein the rotation restrictor is structured to restrict rotation of the first end of the hydraulic fluid conduit relative to the joint securing area. Additional inventive features will become apparent from the description below, and such features may be combined with the above features to provide additional benefits.

DETAILED DESCRIPTION OF THE EMBODIMENTS

Figure 1:
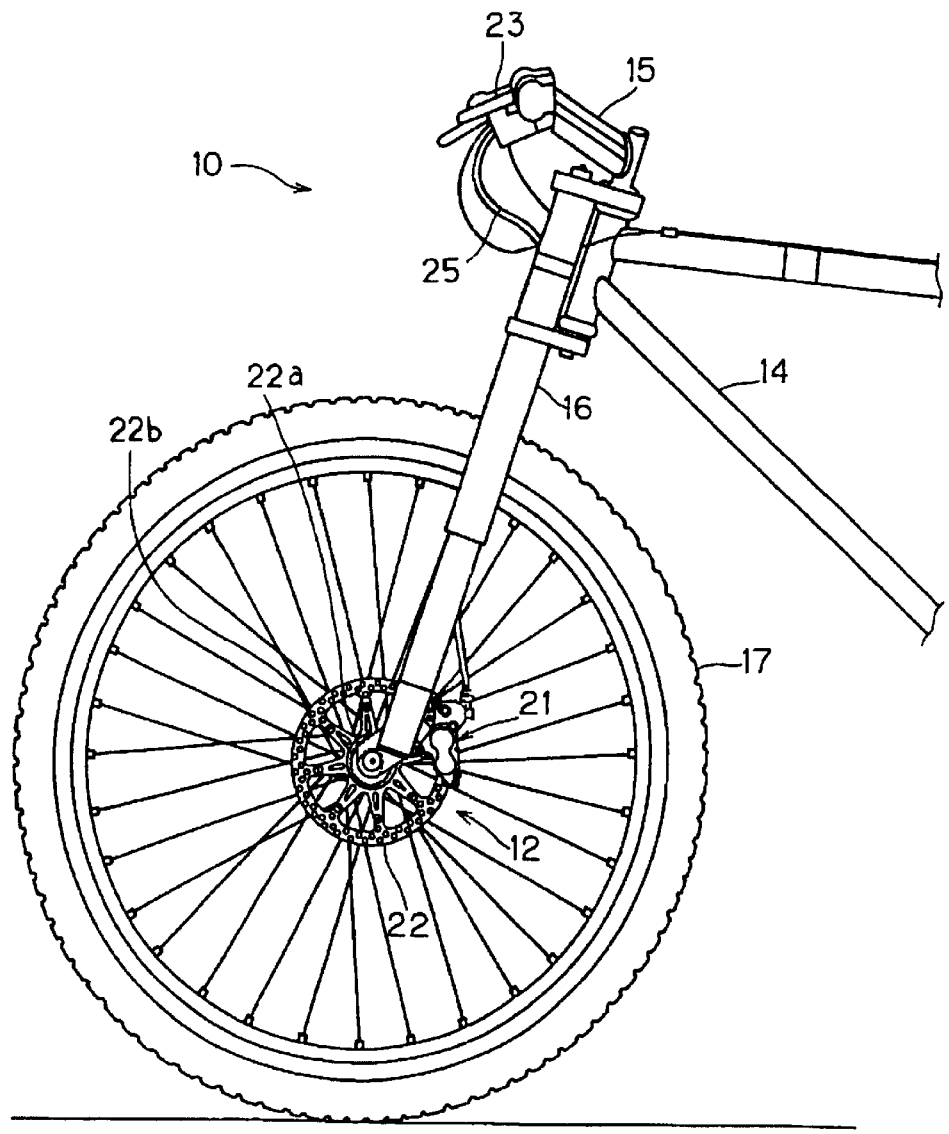
FIG. 1 is a side view of a front portion of a bicycle including a particular embodiment of a brake control device.

FIG. 1 is a side view of a front portion of a bicycle 10 including a particular embodiment of a braking apparatus. The bicycle 10 is known in the conventional art, and it includes a bicycle frame 14 having a handlebar 15, front and rear forks 16 (only the front fork having a double crown suspension is shown in the figure), front and rear wheels 17 (only the front wheel is shown in the figure), a drive system including sprockets and a chain (not shown), and front and rear disc brake systems 12 (only the front disc brake system is shown in the figure).

The front disc brake system 12 includes a brake apparatus 18, a brake control device 23, and a brake hose 25. Brake apparatus 18 comprises a brake caliper 21 that is mounted to the front fork 16, and a disc rotor 22 that is mounted to the front wheel 17. Brake control device 23 controls the operation of the brake apparatus 18, and brake hose 25 hydraulically connects the brake apparatus 18 to the brake control device 23. A connecting joint 26 that is secured to the brake control device 23 is connected to the upper end of the brake hose 25.

The disc rotor 22 is secured to the hub of the front wheel 17, as shown in FIG. 1, and rotates together with it. The disc rotor 22 is a round plate-shaped member formed from stainless steel alloy, for example. Disc rotor 22 comprises a ring-shaped rotor member 22b, the outer surfaces of which constitute friction contact surfaces, and a centrally-disposed hub mounting member 22a, such members being formed as a single unit.

Figure 2:
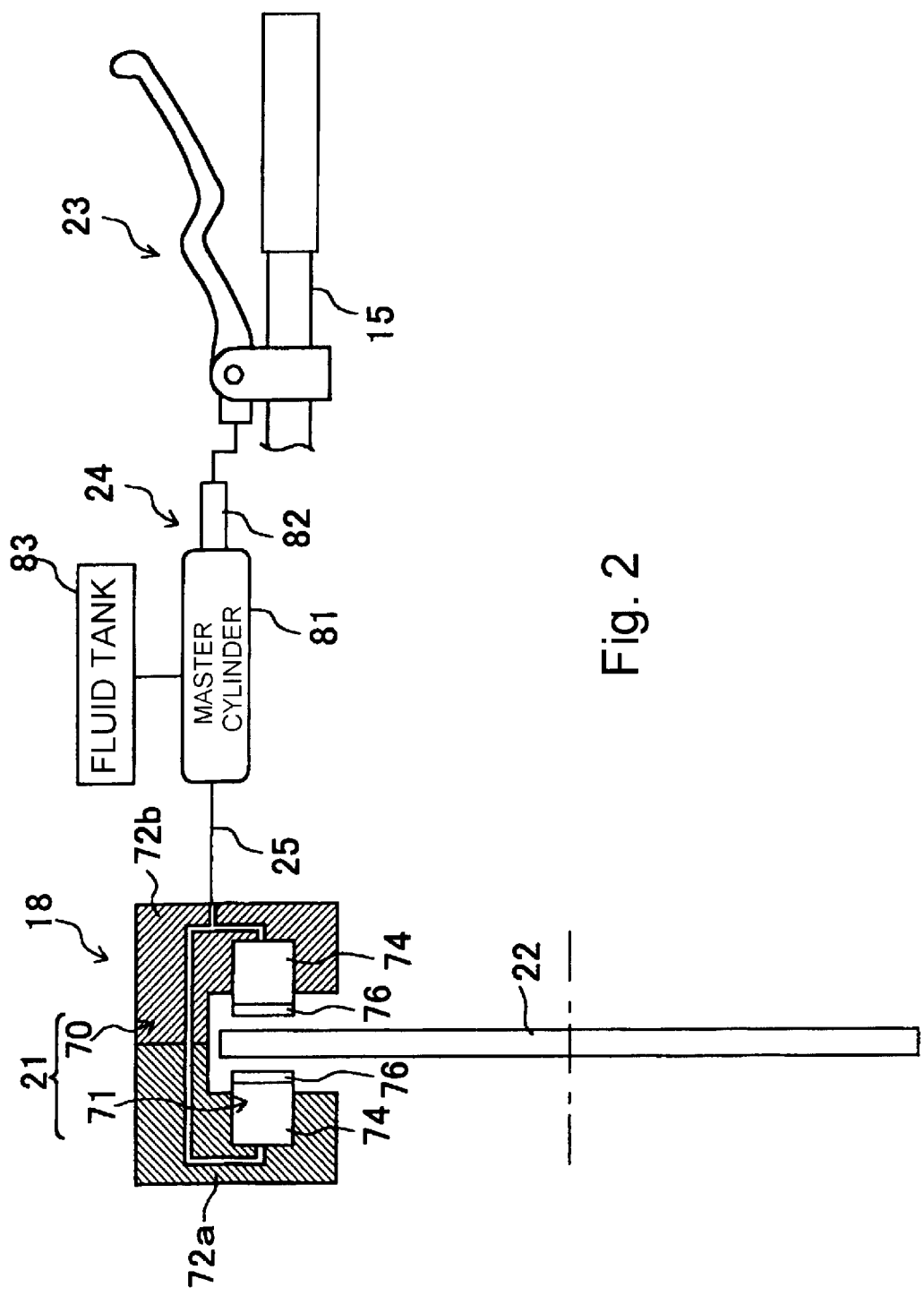
FIG. 2 schematic view of a particular embodiment of a brake apparatus used with the bicycle shown in FIG. 1.
Figure 3:
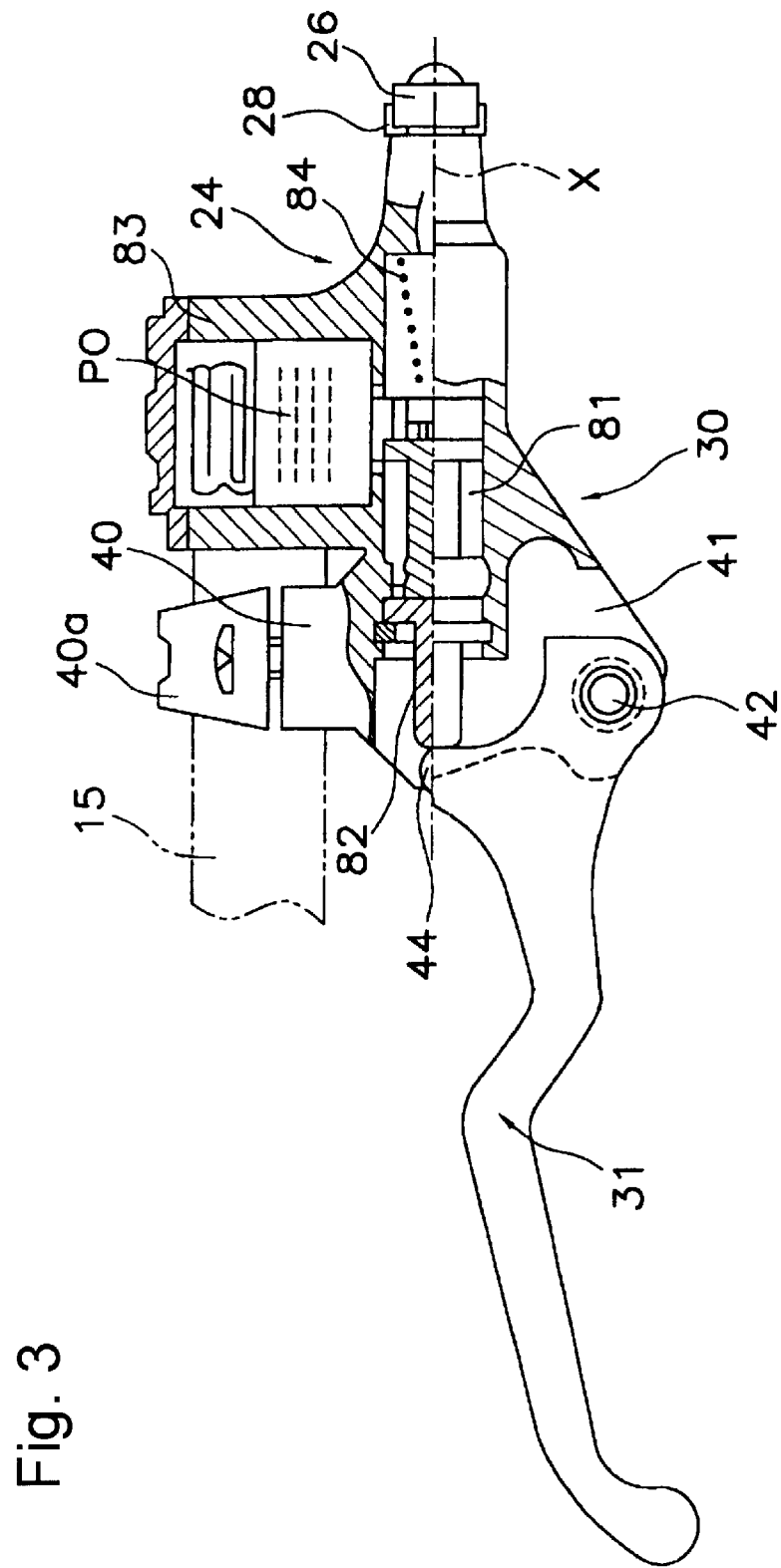
FIG. 3 is a partial cross-sectional view of a particular embodiment of a brake control device used with the bicycle shown in FIG. 1.

The brake caliper 21 is mounted to the front fork 16 of the bicycle 10 at a position near the disc rotor 22, and it can apply constricting force to the disc rotor 22 to stop its rotation. As shown in FIG. 2, the brake caliper 21 includes a housing 70 and a piston unit 71. The housing 70 comprises a heat-conductive material such as aluminum alloy, and it has a first housing member 72a and a second housing member 72b that are connected together using a bolt. The two housing members 72a and 72b have essentially the same configuration. One end of the brake hose 25 is connected to the second housing member 72b to supply brake fluid to the housing members 72a and 72b. The piston unit 71 has four pistons 74 (only two are shown in the figure) and a pair of brake pads 76. The pistons 74 are movably placed in the first housing member 72a and the second housing member 72b, respectively, and move between a brake release position and a braking position. The brake pads 76 are disposed on the ends of the pistons 74 and move integrally therewith. Therefore, when the pistons 74 move from the brake release position to the brake position, the brake pads 76 also move from the brake release position to the braking position. When located at the braking position, the brake pads 76 grasp either side of the disc rotor 22 via friction engagement therewith, thus braking the front wheel 17 via the disc rotor 22. When located at the brake release position, the brake pads 76 are separated from the disc rotor 22, thus releasing the disc rotor 22 and permitting it to rotate freely.

The brake control device 23 is fluidly connected to the brake apparatus 18 via the brake hose 25. As shown in FIGS. 3 through 6, the brake control device 23 includes a bracket 30 that can be mounted to the handlebar 15, a manually-operable lever member 31 that is movably disposed on the bracket 30, a hydraulic fluid transmission unit 24 that can transmit brake fluid to the front disc brake system 12 via the brake hose 25 (through compression of the brake fluid resulting from movement of the lever 31), a joint securing area 27 disposed on the hydraulic fluid transmission unit 24 for securing connecting joint 26, and a rotation restrictor 28 that is formed in close proximity to the joint securing area 27 to restrict the rotation of the connecting joint 26.

In this embodiment, the bracket 30 is integrally formed with the hydraulic fluid transmission unit 24. Bracket 30 has a mounting piece 40 that is mounted to the handlebar 15 and a support member 41 that is integrally formed with the mounting piece 40. A mounting band 40a is placed such that it surrounds the handlebar 15, and bracket 30 can be mounted to the handlebar 15 by inserting a bolt through the mounting band 40a and into mounting piece 40. A movement shaft 42 is disposed in the support member 41 along an axis that is generally perpendicular to the handlebar 15. The lever member 31 is rotatably mounted to the movement shaft 42 and protrudes from the bracket 30. Lever member 31 can move in a direction such that it approaches the handlebar 15 from the brake release position shown in FIG. 3.

The hydraulic fluid transmission unit 24 has a master cylinder 81, a piston 82 that moves inside the master cylinder 81 along an axis of operation X to compress the brake fluid, and a fluid tank 83 that stores the brake fluid. The fluid tank 83 and the master cylinder 81 are integrally formed with the bracket 30. One end of the piston 82 protrudes from the master cylinder 81 toward the left in FIG. 3 such that it comes into contact with a contact piece 44 of the lever member 31, and force is applied to the piston 82 toward the left in FIG. 3 via a return spring 84. As a result, force is applied to the lever member 31 in the direction of the brake release position.

Figure 4:
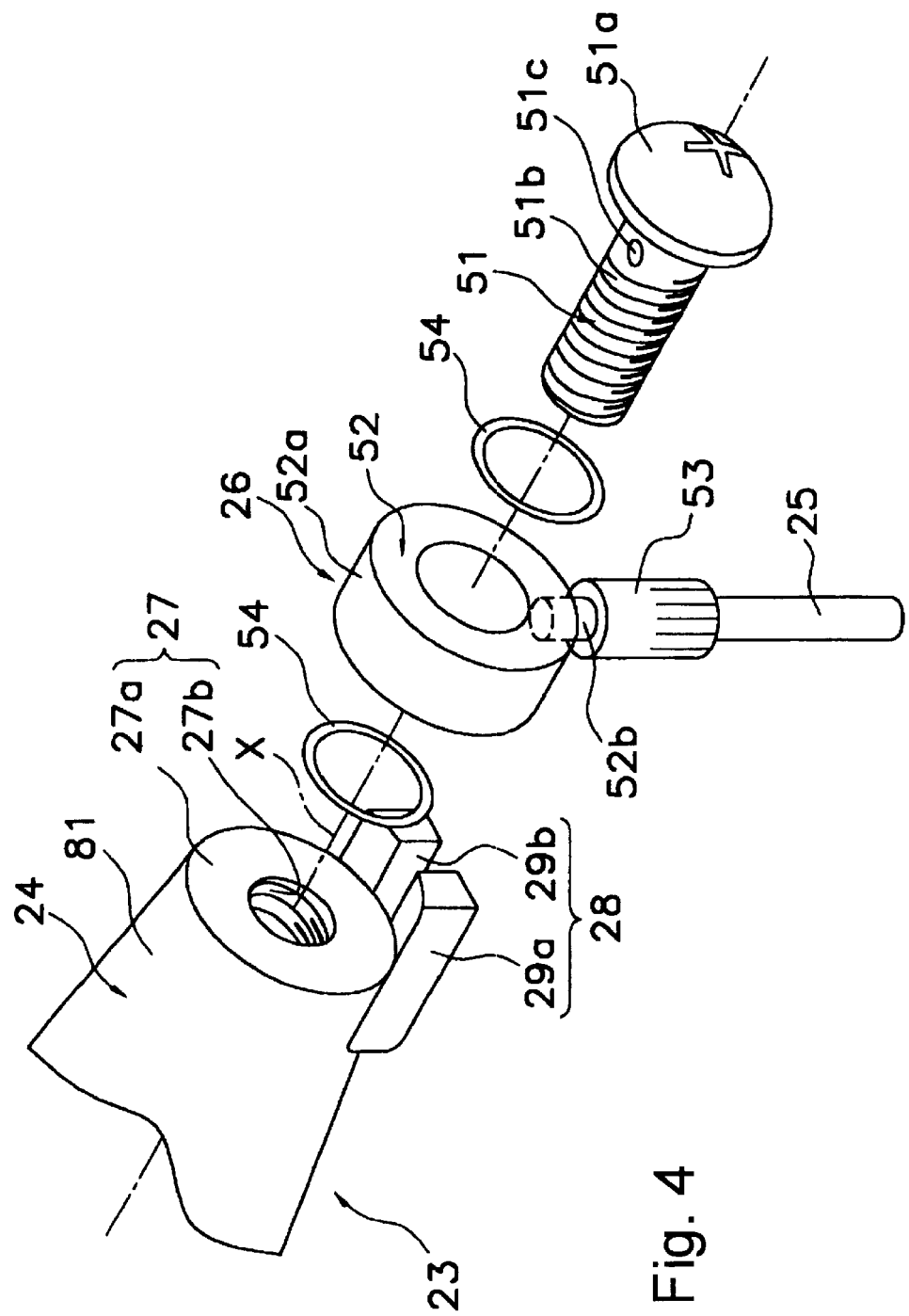
FIG. 4 is an exploded perspective view of a particular embodiment of brake hose connecting components used with the brake control device shown in FIG. 3.

Connecting joint 26 is mounted to the tip of the master cylinder 81 at the joint securing area. 27. As shown in FIG. 4, the joint securing area 27 comprises a securing surface 27a and a screw hole 27b. Securing surface 27a is formed on one end surface of the master cylinder 81 of the hydraulic fluid transmission unit 24 such that the securing surface 27a lies perpendicular to the axis of operation X. Screw hole 27b is formed essentially in the center of the securing surface 27a.

The connecting joint 26 has a bolt member 51 that is screwed into the screw hole 27b, a joint main unit 52, and a caulking member 53 that caulks and secures the brake hose 25 to the joint main unit 52. O-rings 54 are placed between the top 51a of the bolt member 51 and one side surface of the joint main unit 52, and between the securing surface 27a of the master cylinder 81 and the other side surface of the joint main unit 52, respectively.

Figure 5:
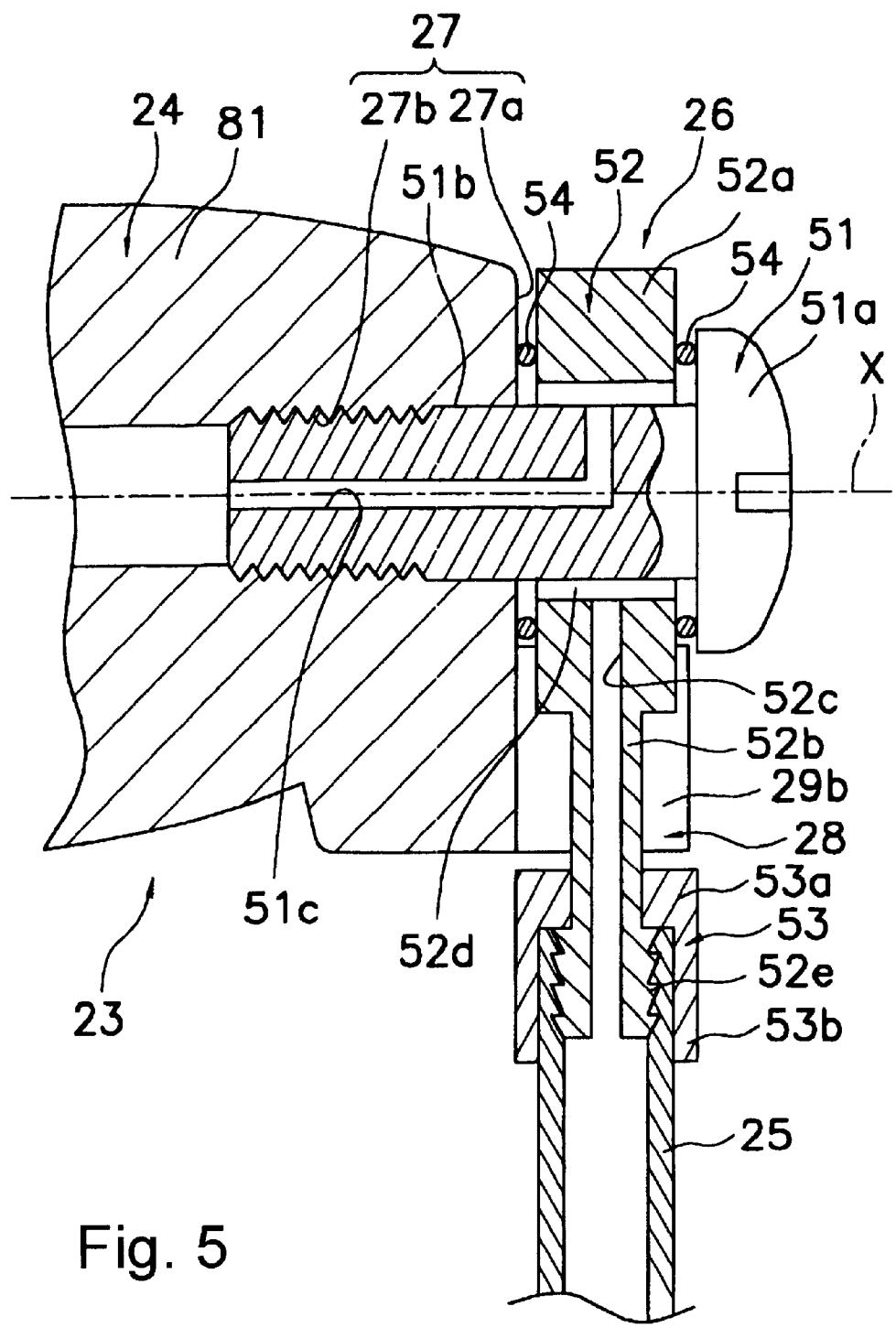
FIG. 5 is a side cross-sectional view of the brake hose connecting components in an assembled condition.

As shown in FIG. 5, a fluid path 51c is formed in a shaft 51b of bolt member 51. Fluid path 51c extends through the tip of the bolt member 51 and along the center of bolt member 51. Fluid path 51c opens through the outer circumferential surface of bolt member 51 partway though the shaft 51b of the bolt member 51. The opening of the fluid path 51c is located in close proximity to the inner circumferential surface of the joint main unit 52.

The joint main unit 52 has a cylindrical member 52a and a hose connector 52b. Bolt member 51 passes through the center of cylindrical member 52a and secures cylindrical member 52a to the joint securing area 27. The inner diameter of the cylindrical member 52a is larger than the outer diameter of the shaft 51b of the bolt member 51, thus forming a cylindrical space 52d between the shaft 51b of the bolt member 51 and the inner circumferential surface of the cylindrical member 52a. The fluid exiting fluid path 51c flows into cylindrical space 52d and toward hose connector 52b.

Hose connector 52b extends radially outwardly from the outer circumferential surface of the cylindrical member 52a and forms a fluid path 52c. A sawtooth area 52e that has a sawtooth cross-sectional configuration is formed on the outer circumferential surface of the tip of hose connector 52b. The brake hose 25 is fitted over this sawtooth area 52e so that the sawtooth area locks the brake hose 25 in place. The hose connector 52b may be formed integrally with the cylindrical member 52a and/or fixed using some other fixing means such as welding or screw attachment. Both side surfaces of the cylindrical member 52a are sealed by the O-rings 54. As a result, a closed fluid channel that extends from the hydraulic fluid transmission unit 24 to the brake hose 25 is formed by the hydraulic fluid path 51c in the bolt member 51, the cylindrical space 52d and the hydraulic fluid path 52c.

The caulking member 53 is disposed with a gap between the sawtooth area 52e of the hose connector 52b and the outer circumferential surface of the cylindrical member 52a. The caulking member 53 has a round plate-shaped fixed piece 53a and a cylindrical caulking piece 53b. Fixed piece 53a is welded or otherwise fixed to the hose connector 52b. Caulking piece 53b extends from the outer circumference of the fixed piece 53a and covers the outer circumferential surface of the brake hose 25. The brake hose 25 is firmly secured and sealed to the hose connector 52b by pressing the caulking member 53b toward the sawtooth area 52e, such as by crimping.

Figure 6:
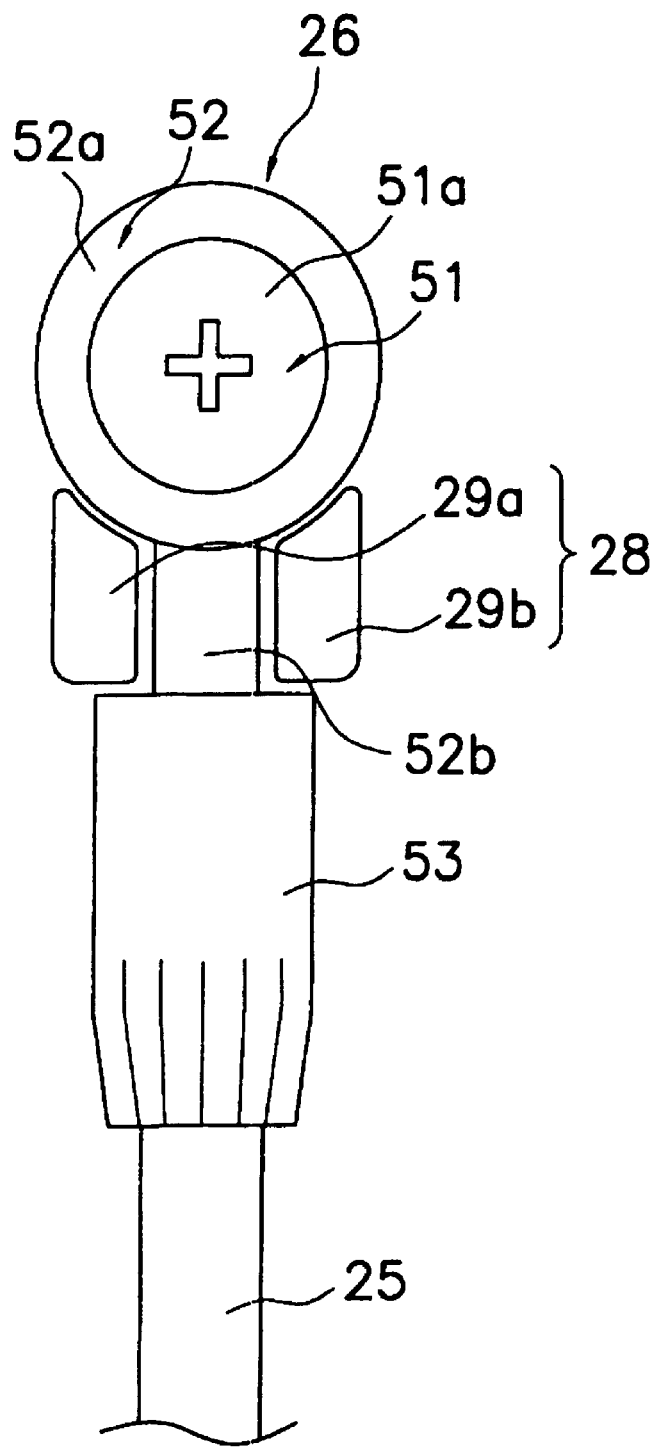
FIG. 6 is a front view of the brake hose connecting components in the assembled condition.

The rotation restrictor 28 comprises a pair of protrusions 29a and 29b that protrude in the direction of the axis of operation X in close proximity to the securing surface 27a. Protrusions 29a and 29b are disposed such that they sandwich the hose connector 52b between the outer circumferential surface of cylindrical member 52a and the fixed piece 53a of the caulking member 53. This construction restricts the rotation of the connecting joint 26 around the axis of operation X, as shown in FIG. 6. A small gap is formed between the hose connector 52b and the pair of protrusions 29a and 29b so that the connecting joint 26 can rotate only slightly between the protrusions 29a and 29b when it is being attached or detached.

The brake control device 23 is assembled as follows. First, the brake hose 25 is connected to the sawtooth area 52e of hose connector 52b and then caulked and secured by crimping the caulking member 53. The O-rings 54 are then placed on either side of the cylindrical member 52a as shown in FIG. 4, and the hose connector 52b is fitted between the protrusions 29a and 29b. The bolt member 51 is passed through the center of cylindrical member 52a and screwed into the screw hole 27b of the joint securing area 27. When this is done, the joint main unit 52 is mounted such that the hose connector 52b of the connecting joint 26 is sandwiched by the pair of protrusions 29a and 29b. When the bolt member 51 is tightened using a tool such as a screwdriver, thereby exerting a friction force on the joint main unit 52 that tends to rotate the joint main unit 52 clockwise together with the bolt member 51, the hose connector 52 is prevented from rotating by the left side protrusion 29a. Consequently, the joint main unit 52 does not rotate together with the bolt member 51. Also, the direction of connection of the brake hose 25 does not deviate from the preset direction, thus making it easy to connect the brake hose 25. The connecting joint 26 may be further secured to the joint securing area 27 by tightening the bolt member 51 to the point at which appropriate pressure is exerted on the O-rings 54, and the fluid channel described above is formed.

After the bolt member 51 has been screwed in, the protrusion 29b also acts as a rotation stopper when the brake hose 25 or the caulking member 53 is subjected to an external force that tends to rotate the joint main unit 52 in the counterclockwise direction. Protrusion 29b thus functions to prevent the loosening of the bolt member 51.

To detach the brake hose 25, the bolt member 51 should be loosened. Normally, the joint main unit 52 has a tendency to rotate counterclockwise together with the bolt member 51 because of the friction between joint main unit 52 and bolt member 51 in the tightened condition. However, in this case such counterclockwise rotation of the hose connector 52b is restricted by the right protrusion 29b, so the joint main unit 52 does not rotate together with the bolt member 51. Consequently, the brake hose 25 can be easily detached as well. In any event, because the securing surface 27a of the connecting joint 26 is perpendicular to the axis of operation X of the master cylinder 81, the joint securing area 27 can be aligned with the axis of operation X, thus making the construction of the joint securing area 27 simple.

Figure 7:
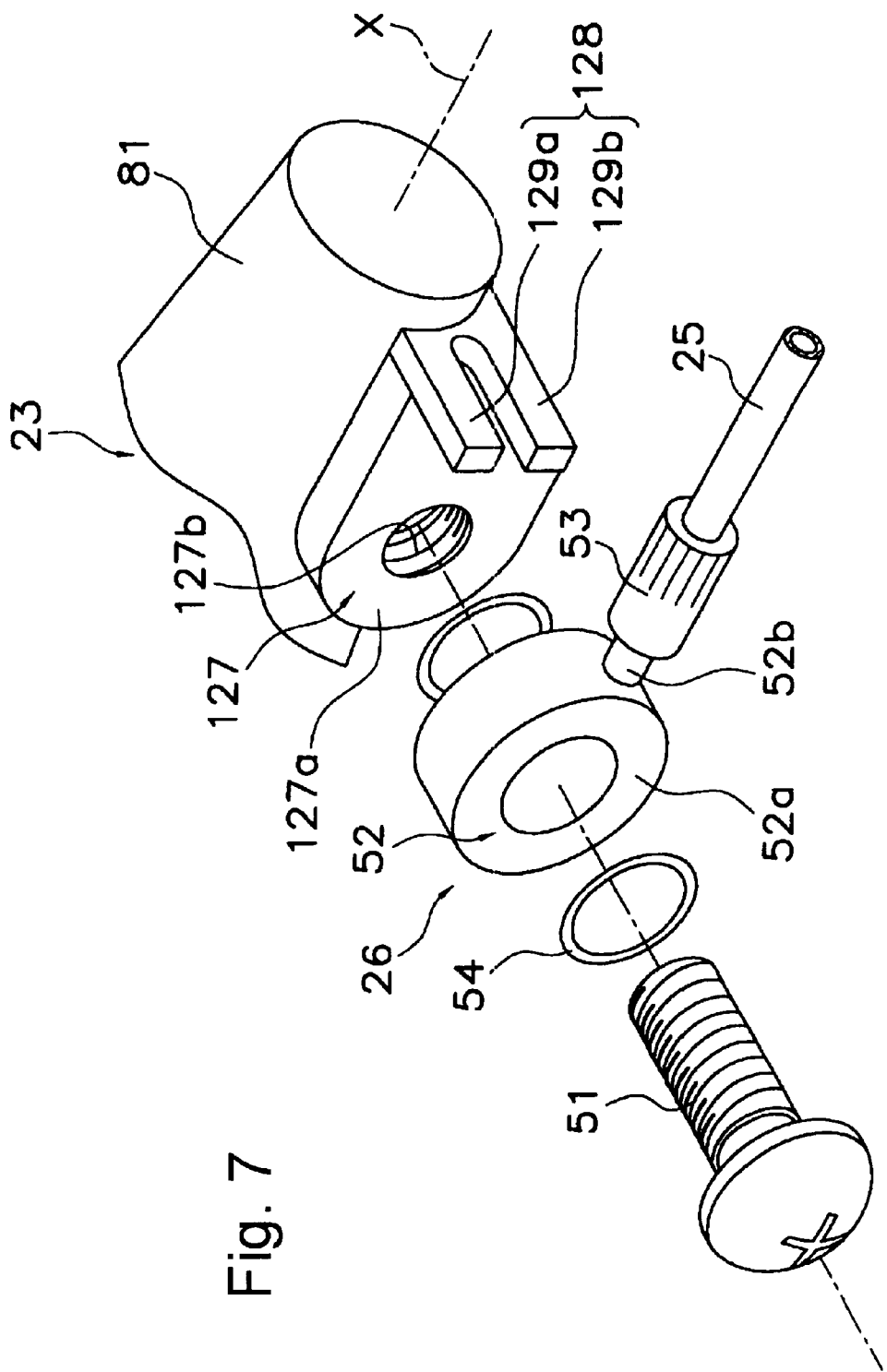
FIG. 7 is an exploded view of an alternative embodiment of brake hose connecting components.

While the above is a description of various embodiments of inventive features, further modifications may be employed without departing from the spirit and scope of the present invention. For example, in the above embodiment, the securing surface 27a of the joint securing area 27 was perpendicular to the axis of operation X, but a securing surface 127a of a joint securing area 127 may be parallel to the axis of operation X, as shown in FIG. 7. The securing surface 127a is formed on the outer circumferential surface of the master cylinder 81 in a protruding fashion, and a screw hole 127b is formed in the securing surface 127a. A rotation restrictor 128 comprises a pair of protrusions 129a and 129b. The protrusions 129a and 129b may be formed on the right side of the securing surface, typically with a vertical gap therebetween. The remainder of the construction is identical to that of the previous embodiment, so a detailed explanation thereof will be omitted. Because the connecting joint is disposed perpendicular to the axis of operation X in this embodiment, the brake control device 23 can be made shorter in length along the axis of operation X when the connecting joint 26 is attached thereto.

In the above embodiments, the rotation restrictor comprised one or more protrusions, but one or more protrusions may be formed on the connecting joint (e.g., pointing outwardly from an area of the outer scaling surface of the cylindrical member 52a of the joint main unit 52 toward the securing surface 27a), and one or more concavities formed in the securing surface 27a.

In the above embodiments, the rotation restrictor 28 was formed integrally with the master cylinder 81, but it can constitute one or more separate components. It is also possible to select the direction in which the brake hose 25 is removed by allowing the connecting joint 26 to be positioned at multiple positions along the direction of rotation.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A brake control device for connecting to a hydraulic fluid conduit, wherein the hydraulic fluid conduit has a first end for connecting to the brake control device and a second end for connecting to a braking apparatus, wherein the brake control device comprises:

a bracket that can be mounted to a handlebar of the bicycle;

a brake operating member that is movably coupled to the bracket;

a hydraulic fluid transmission unit disposed on the bracket, wherein the hydraulic fluid transmission unit is structured to communicate a hydraulic fluid to the hydraulic fluid conduit in response to movement of the brake operating member;

a joint securing area disposed on the hydraulic fluid transmission unit, wherein the joint securing area is structured to couple to the first end of the hydraulic fluid conduit; and a rotation restrictor disposed in close proximity to the joint securing area, wherein the rotation restrictor is structured to restrict rotation of the first end of the hydraulic fluid conduit relative to the joint securing area, and wherein the rotation restrictor includes an abutment that faces in a circumferential direction to restrict rotation of the hydraulic fluid conduit.

2. The device according to claim 1 wherein the rotation restrictor comprises a first abutment structured to engage the first end of the hydraulic fluid conduit.

3. A brake control device for connecting to a hydraulic fluid conduit, wherein the hydraulic fluid conduit has a first end for connecting to the brake control device and a second end for connecting to a braking apparatus, wherein the brake control device comprises:

a bracket that can be mounted to a handlebar of the bicycle;

a brake operating member that is movably coupled to the bracket;

a hydraulic fluid transmission unit disposed on the bracket, wherein the hydraulic fluid transmission unit is structured to communicate a hydraulic fluid to the hydraulic fluid conduit in response to movement of the brake operating member;

a joint securing area disposed on the hydraulic fluid transmission unit, wherein the joint securing area is structured to couple to the first end of the hydraulic fluid conduit a rotation restrictor disposed in close proximity to the joint securing area, wherein the rotation restrictor is structured to restrict rotation of the first end of the hydraulic fluid conduit relative to the joint securing area;

wherein the rotation restrictor comprises a first abutment structured to engage the first end of the hydraulic fluid conduit; and wherein the rotation restrictor comprises a first protrusion that forms the first abutment.

4. The device according to claim 3 wherein the first protrusion is disposed in close proximity to the joint securing area and protrudes from the hydraulic fluid transmission unit.

5. A brake control device for connecting to a hydraulic fluid conduit, wherein the hydraulic fluid conduit has a first end for connecting to the brake control device and a second end for connecting to a braking apparatus, wherein the brake control device comprises:

a bracket that can be mounted to a handlebar of the bicycle;

a brake operating member that is movably coupled to the bracket;

a hydraulic fluid transmission unit disposed on the bracket, wherein the hydraulic fluid transmission unit is structured to communicate a hydraulic fluid to the hydraulic fluid conduit in response to movement of the brake operating member;

a joint securing area disposed on the hydraulic fluid transmission unit, wherein the joint securing area is structured to couple to the first end of the hydraulic fluid conduit; and a rotation restrictor disposed in close proximity to the joint securing area, wherein the rotation restrictor is structured to restrict rotation of the first end of the hydraulic fluid conduit relative to the joint securing area, wherein the rotation restrictor comprises:

a first abutment structured to engage the first end of the hydraulic fluid conduit; and a second abutment structured to engage the first end of the hydraulic fluid conduit.

6. The device according to claim 5 wherein the rotation restrictor comprises:

a first protrusion that forms the first abutment; and a second protrusion that forms the second abutment.

7. The device according to claim 6 wherein the first protrusion and the second protrusion are structured to sandwich the first end of the brake conduit.

8. The device according to claim 7 wherein the first protrusion and the second protrusion both are disposed in close proximity to the joint securing area and protrude from the hydraulic fluid transmission unit.

9. A brake control device comprising:

a bracket that can be mounted to a handlebar of the bicycle;

a brake operating member that is movably coupled to the bracket;

a hydraulic fluid transmission unit disposed on the bracket;

a hydraulic fluid conduit that provides hydraulic fluid to a braking apparatus;

wherein the hydraulic fluid transmission unit communicates a hydraulic fluid to the hydraulic fluid conduit in response to movement of the brake operating member;

a joint securing area disposed on the hydraulic fluid transmission unit, wherein the hydraulic fluid conduit is coupled to the joint securing area; and a rotation restrictor disposed at the joint securing area, wherein the rotation restrictor restricts rotation of the hydraulic fluid conduit relative to the joint securing area, and wherein the rotation restrictor includes an abutment that faces in a circumferential direction to restrict rotation of the hydraulic fluid conduit.

10. The device according to claim 9 wherein the hydraulic fluid conduit includes a generally tubular member retained to the joint securing area.

11. The device according to claim 10 wherein the rotation restrictor restricts rotation of the tubular member at the joint securing area.

12. The device according to claim 11 wherein the hydraulic fluid conduit includes a bolt member extending through the tubular member, and wherein the rotation restrictor inhibits integral rotation of the tubular member and the bolt member relative to the joint securing area.

13. The device according to claim 12 wherein the hydraulic fluid conduit includes a hose connector that extends radially outwardly from an outer circumferential surface of the tubular member.

14. The device according to claim 9 wherein the hydraulic fluid transmission unit has a cylinder and a piston that moves inside the cylinder along an axis of operation to compress the hydraulic fluid, wherein the hydraulic fluid conduit includes a rotatable connecting joint, wherein the joint securing area has a securing surface to which the connecting joint is secured, and wherein the securing surface is substantially perpendicular to the axis of operation.

15. The device according to claim 9 wherein the hydraulic fluid transmission unit has a cylinder and a piston that moves inside the cylinder along an axis of operation to compress the hydraulic fluid, wherein the first end of the hydraulic fluid conduit includes a rotatable connecting joint, wherein the joint securing area has a securing surface to which the connecting joint is secured, and wherein the securing surface is substantially parallel to the axis of operation.

16. A brake control device comprising:
   a bracket that can be mounted to a handlebar of the bicycle;
   a brake operating member that is movably coupled to the bracket;
   a hydraulic fluid transmission unit disposed on the bracket;
   a hydraulic fluid conduit that provides hydraulic fluid to a braking apparatus, wherein the hydraulic fluid conduit includes a generally tubular member and a hose connector extending from the tubular member;
   wherein the hydraulic fluid transmission unit communicates a hydraulic fluid to the hydraulic fluid conduit in response to movement of the brake operating member;
   a joint securing area disposed on the hydraulic fluid transmission unit, wherein the tubular member is retained to the joint securing area; and
   a rotation restrictor disposed at the joint securing area, wherein the rotation restrictor restricts rotation of the hydraulic fluid conduit relative to the joint securing area, and wherein the rotation restrictor comprises first and second protrusions that sandwich the hose connector.

17. The device according to claim 16 wherein the hose connector comprises:
   an outer circumferential surface over which is placed a brake hose;
   a caulking member adapted to secure the brake hose to the outer circumferential surface, wherein the caulking member forms a gap with the tubular member; and
   wherein the first and second protrusions are disposed in the gap between the tubular member an the caulking member.

18. The device according to claim 17 wherein the tubular member has a generally cylindrical shape.

19. A brake control device comprising:
   a bracket that can be mounted to a handlebar of the bicycle;
   a brake operating member that is movably coupled to the bracket;
   a hydraulic fluid transmission unit disposed on the bracket;
   a hydraulic fluid conduit that provides hydraulic fluid to a braking apparatus;
   wherein the hydraulic fluid transmission unit communicates a hydraulic fluid to the hydraulic fluid conduit in response to movement of the brake operating member;
   a joint securing area disposed on the hydraulic fluid transmission unit, wherein the hydraulic fluid conduit is coupled to the joint securing area;
   wherein the hydraulic fluid transmission unit has a cylinder and a piston that moves inside the cylinder along an axis of operation to compress the hydraulic fluid, wherein the hydraulic fluid conduit includes a rotatable connecting joint, wherein the joint securing area has a securing surface to which the connecting joint is secured, and wherein the securing surface is substantially perpendicular to the axis of operation; and
   a rotation restrictor disposed at the joint securing area, wherein the rotation restrictor restricts rotation of the hydraulic fluid conduit relative to the joint securing area, and wherein the rotation restrictor comprises:
      a first protrusion that engages the hydraulic fluid conduit; and
      a second protrusion that engages the hydraulic fluid conduit.

20. The device according to claim 19 wherein the first protrusion and the second protrusion sandwich the hydraulic fluid conduit.

21. The device according to claim 20 wherein the connecting joint comprises:
   a generally tubular member retained to the joint securing area;
   bolt member extending through the tubular member;
   a hose connector that extends radially outwardly from an outer circumferential surface of the tubular member; and
   a caulking member adapted to secure the brake hose to the hose connector, wherein the caulking member forms a gap with the tubular member; and
   wherein the first and second protrusions are disposed in the gap between the tubular member and the caulking member.

22. A brake control device comprising:
   a bracket that can be mounted to a handlebar of the bicycle;
   a brake operating member that is movably coupled to the bracket;
   a hydraulic fluid transmission unit disposed on the bracket;
   a hydraulic fluid conduit that provides hydraulic fluid to a braking apparatus;
   wherein the hydraulic fluid transmission unit communicates a hydraulic fluid to the hydraulic fluid conduit in response to movement of the brake operating member;
   a joint securing area disposed on the hydraulic fluid transmission unit, wherein the hydraulic fluid conduit is coupled to the joint securing area;
   wherein the hydraulic fluid transmission unit has a cylinder and a piston that moves inside the cylinder along an axis of operation to compress the hydraulic fluid, wherein the first end of the hydraulic fluid conduit includes a rotatable connecting joint, wherein the joint securing area has a securing surface to which the connecting joint is secured, and wherein the securing surface is substantially parallel to the axis of operation; and
   a rotation restrictor disposed at the joint securing area, wherein the rotation restrictor restricts rotation of the hydraulic fluid conduit relative to the joint securing area, and wherein the rotation restrictor comprises:
      a first protrusion that engages the hydraulic fluid conduit; and a second protrusion that engages the hydraulic fluid conduit.

23. The device according to claim 22 wherein the first protrusion and the second protrusion sandwich the hydraulic fluid conduit.

24. The device according to claim 23 wherein the connecting joint comprises:

a generally tubular member retained to the joint securing area;

bolt member extending through the tubular member;

a hose connector that extends radially outwardly from an outer circumferential surface of the tubular member;

a caulking member adapted to secure the brake hose to the hose connector, wherein the caulking member forms a gap with the tubular member; and wherein the first and second protrusions are disposed in the gap between the tubular member and the caulking member.

* * * * *